United States Patent [19]

Gallone

[11] Patent Number: 5,484,210
[45] Date of Patent: Jan. 16, 1996

[54] SLIDING BLOCK WITH ADJUSTABLE TRACK POSITIONING

[75] Inventor: Fiorenzo Gallone, Milan, Italy

[73] Assignee: T.M.T. Transmissioni Meccaniche Torino S.r.l., Milan, Italy

[21] Appl. No.: 320,756

[22] Filed: Oct. 11, 1994

[30] Foreign Application Priority Data

Oct. 12, 1993 [IT] Italy ................... MI93U0785

[51] Int. Cl.⁶ .................................................. F16C 29/12
[52] U.S. Cl. .................... 384/49; 384/40; 384/57
[58] Field of Search ......................... 384/57, 50, 49, 384/45, 44, 40, 39

[56] References Cited

U.S. PATENT DOCUMENTS

| | | | |
|---|---|---|---|
| 2,111,096 | 3/1938 | Fritzsch | 384/40 |
| 2,453,875 | 11/1948 | Terhune | 384/40 |
| 2,914,362 | 11/1959 | Ott et al. | 384/40 |
| 3,389,625 | 6/1968 | Wagner | 384/57 X |
| 3,436,132 | 4/1969 | Wiesler . | |
| 3,897,982 | 8/1975 | Teramachi | 384/45 |
| 4,231,621 | 11/1980 | Teramachi | 384/45 |
| 4,363,526 | 12/1982 | Teramachi | 384/45 |
| 4,796,516 | 1/1989 | Horváth | 384/49 X |
| 4,941,758 | 7/1990 | Osawa | 384/40 |

FOREIGN PATENT DOCUMENTS

| | | | |
|---|---|---|---|
| 3400824 | 9/1984 | Germany . | |
| 548782 | 10/1942 | United Kingdom | 384/40 |

Primary Examiner—Thomas R. Hannon
Attorney, Agent, or Firm—Oblon, Spivak, McClelland, Maier & Neustadt

[57] ABSTRACT

A sliding block with adjustable track positioning comprising a prismatic body, in one face of which there is a longitudinal recess arranged to receive a rail by way of rolling elements positionable in respective tracks, the body being essentially of C-shaped cross-section consisting of a central part from which two flanges extend, wherein in at least one of the two flanges of the C-shaped cross-section there is provided a second longitudinal recess which divides it into separate portions connected together at the central part, the second recess containing elements for adjusting the distance between the two separate portions.

17 Claims, 6 Drawing Sheets

SLIDING BLOCK WITH ADJUSTABLE TRACK POSITIONING

This invention relates to a sliding block with adjustable track positioning.

Linear sliding guide units generally comprise two main constituent elements, namely an inner element and an outer element slidable relative to each other by way of rolling elements. The inner element is of prismatic shape whereas the outer element is of C-shape, the recess of which carries the inner element. The former is usually known as the rail while the latter is known as the sliding block.

A required basic characteristic of the sliding block is that its rolling tracks for the rolling elements be of adjustable distance apart. This adjustment has two main purposes, namely to adapt the distance between the tracks to the type and size of the rolling element used, and to enable the user to directly adjust the loading or the slack.

In this respect in sliding blocks formed by extrusion, as the distance between the tracks can vary within a range of a few tenths of a millimeter as allowable tolerance in accordance with the relevant standards, the exact distance must be able to be reset. In addition the user must be able to choose the most suitable slack or preload condition for his specific requirements. In known linear sliding units this is not always possible or is inherently difficult because of their structure.

The object of the present invention is to provide a sliding block in which the distance apart of the rolling element tracks can be adjusted in order to be able to use the prechosen best operating condition.

This object is attained according to the present invention by a sliding block with adjustable track positioning comprising a prismatic body, in one face of which there is a longitudinal recess arranged to receive a rail by way of rolling elements positionable in respective tracks, said body being essentially of C-shaped cross-section consisting of a central part from which two flanges extend, characterised in that in at least one of said flanges of said C-shaped cross-section there is provided a second longitudinal recess which divides it into separate portions connected together at said central part, said second recess containing elements for adjusting the distance between said two separate portions.

The characteristics and advantages of a sliding block according to the present invention will be more apparent from the description given hereinafter by way of non-limiting example with reference to the accompanying schematic drawings, in which.

Figure 1:
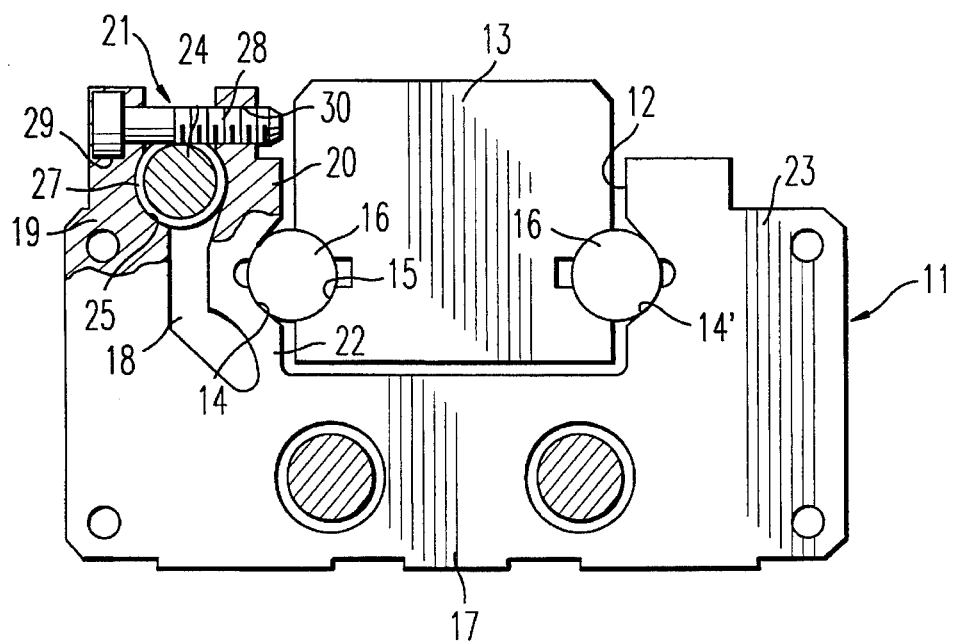
FIG. 1 is a partly sectional elevation of a linear sliding unit using a sliding block with adjustable track positioning according to the present invention.

With general reference to FIG. 1, this represents an elevational view of a linear sliding unit using a sliding block with adjustable track positioning according to the present invention. The figure shows specifically a sliding block, indicated overall by 11, within a recess 12 of which there is located a rail 13. Both the sliding block 11 and the rail 13 are provided in facing surfaces with tracks 14 and 15 respectively, for receiving rolling elements such as balls 16. Both the sliding block 11 with its recess 12 and the rail 13 extend in a direction which will be known as the longitudinal direction. Neither the rail 13 nor the balls 16 are represented in the subsequent exemplifying figures, for ease of description and comprehension.

As stated, the sliding block 11 has a prismatic body, one face of which, for example the upper face, contains the recess 12 for receiving the rail 13. The body is essentially of C-shaped cross-section and thus consists of a central part 17 from which there extent two flanges, which also lie in said longitudinal direction. According to the present invention, one of the two flanges is divided by a variously shaped second recess 18, also lying in the longitudinal direction, into two separate portions 19 and 20 which are connected together in a region extending laterally from the central part 17. A recess 18 could also be provided in the other flange of the sliding block in like manner.

Said second recess 18 contains elements for adjusting the distance between the two separate portions 19 and 20 and indicated overall by 21 in the various embodiments. It should be noted that in addition one of the two separate portions, in the illustrated example that indicated by 20 and facing the interior of the recess 12, has a smaller cross-sectional thickness than the other portion 19.

Figure 2:
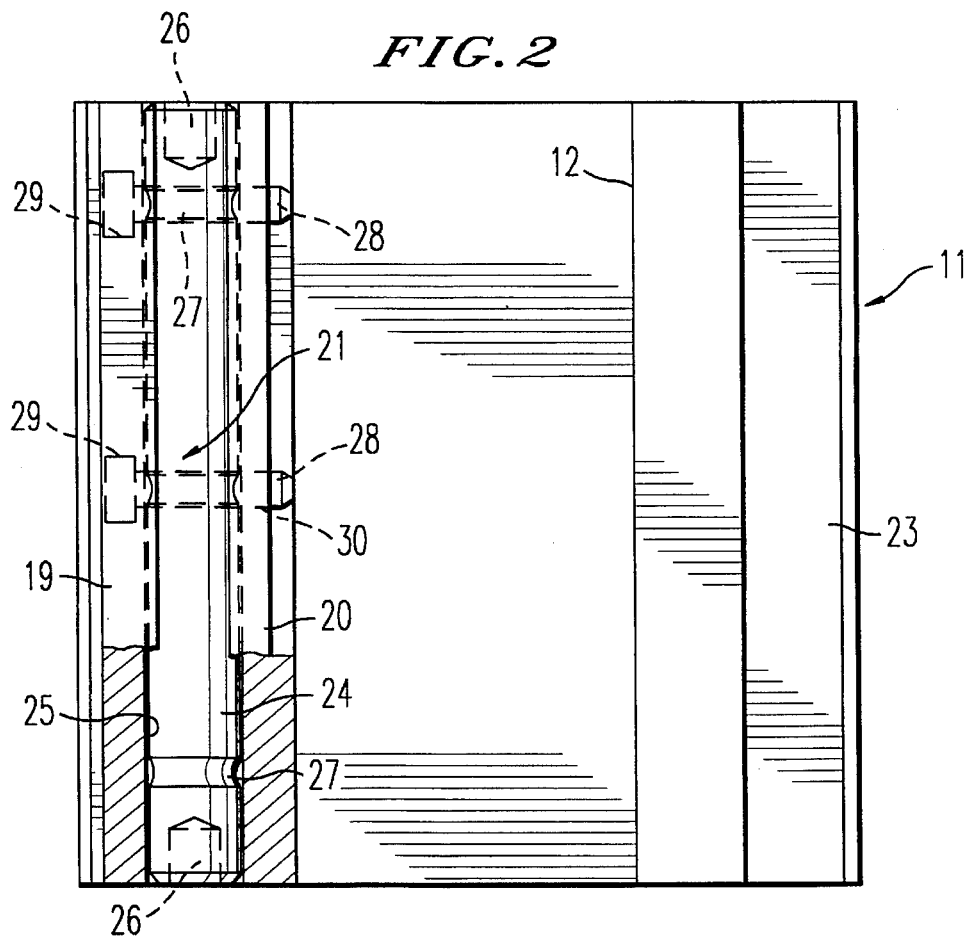
FIG. 2 is a partly sectional top plan view of the sliding block shown in FIG. 1.

In this respect, FIGS. 1 and 2 show a first embodiment in which the second recess 18, formed between the separate portions 19 and 20 of one of the two flanges, is of open L-shaped cross-section, ie with an obtuse angle between the two inner parts of the L and the lower end facing the first recess 12. The portion 20 extending from it is connected to the central part 17 of the sliding block by a reduced section 22 which enables the portion 20 to flex so that it can approach or withdraw from the other portion 19. This flexure therefore determines a decrease or increase in the distance between the track 14 provided in this first flange and the track 14' provided in the opposing second flange 23 located at the other end on a lateral extension of the central part 17 of the body of the sliding block 11.

In the illustrated embodiment, the adjustment elements 21 consist of a shaft 24 arranged in the longitudinal direction and having an eccentric body inserted into a profiled housing 25 provided in facing surfaces of the two separate portions 19 and 20. The ends of the shaft are provided with seats 26 for hexagonal keys for its rotation. Along the body of the shaft 24 there are provided recesses 27 at which screws 28 are positioned. The screws 28 are arranged perpendicular to the shaft 24, ie in a transverse direction both to the flanges and to the recesses in the sliding block. The head of the screws 28 is housed free to rotate in a seat 29 in the first portion 19, the threaded other end being screwed into a corresponding threaded hole 30 provided in the second portion 20.

In this embodiment the operation of the adjustment elements 21 is extremely simple in that by rotating the shaft 24, the portion 20 of the first flange of the sliding block 11 is caused to approach or withdraw from the second flange 23, so as to vary the distance between the tracks 14 and 14'. Having made this adjustment the shaft can be locked in the chosen position by tightening the screws 28, which pass within the recesses 27 to lock it relative to the body of the sliding block. Moreover, the tightening of the screws 28, which pulls the separate portions 19 and 20 of the first flange together, increases the distance between the tracks 14 and 14', so reducing the preload on the sliding unit to hence create slack conditions. Finally the location of the screws 28, for example three in number and cooperating with the respective three cavities 27, prevents withdrawal of the eccentric shaft 24 from its housing 25, even if the portions 19 and 20 are not tightened together.

Reference will now be made to the further embodiments of the sliding block according to the present invention, in which identical elements are indicated by the aforegoing reference numerals.

Figure 3:
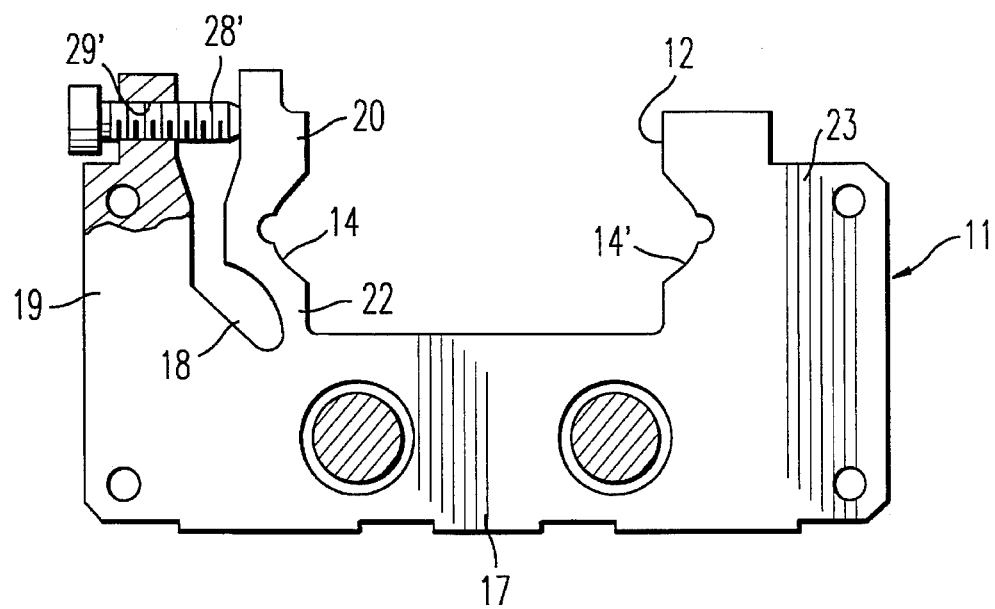
FIGS. 3 and 4 are an elevation and a top plan view of a second embodiment of the sliding block according to the present invention.
Figure 4:
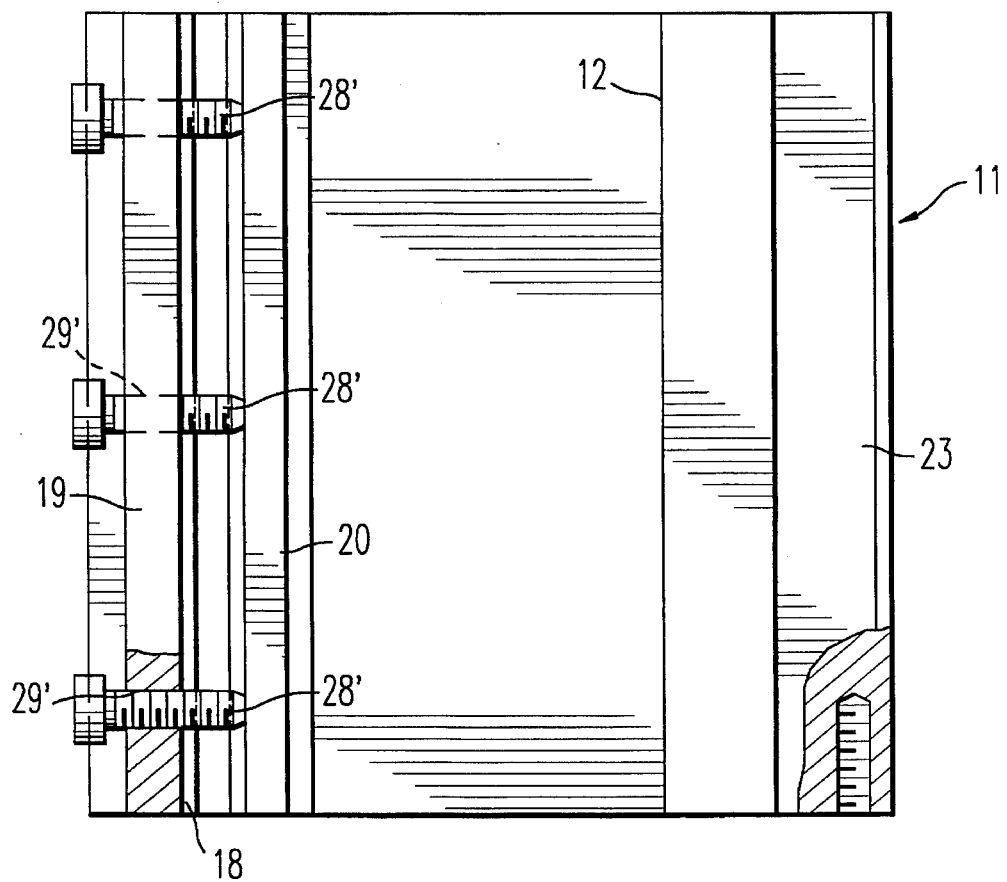

FIGS. 3 and 4 show a second embodiment in which the shaft 24 is not provided, ie the second cavity 18 is empty. Screws 28' are provided, passing through in this case a threaded hole 29' in the portion 19 of the first flange. The second portion 20 of the first flange is without holes, the ends of the screws 28' acting against that inner surface thereof facing the first portion 19. Again in this case the screws 28' can be three in number.

The operation of this second embodiment is even more simple in that the tracks 14 and 14', provided on the recess 12 of the sliding block, are made to approach or withdraw from each other by screwing the screws 28' inwards or outwards. This type of operation is possible again because of the presence of the reduced section 22 of the portion 20 of the first flange, which flexes to vary the distance between the tracks. With this movement the slack and preload of the sliding unit is increased and/or decreased by virtue of the flexure of the reduced section 22. It should also be noted that because of the pressing of the end of the screws 28' against the surface of the separate constituent portion 20 of the second recess, on slackening the screws 28' there is a spontaneous retraction of the portion 20 towards its rest condition by the effect of the elastic reaction of the reduced section 22.

Figure 5:
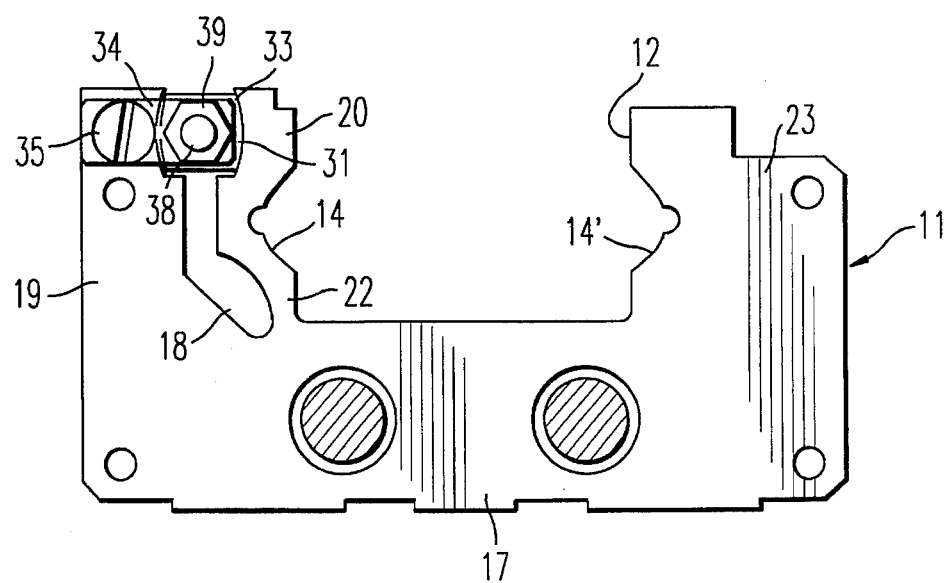
FIGS. 5 and 6 are an elevation and a top plan view of a third embodiment of the sliding block according to the present invention.
Figure 6:
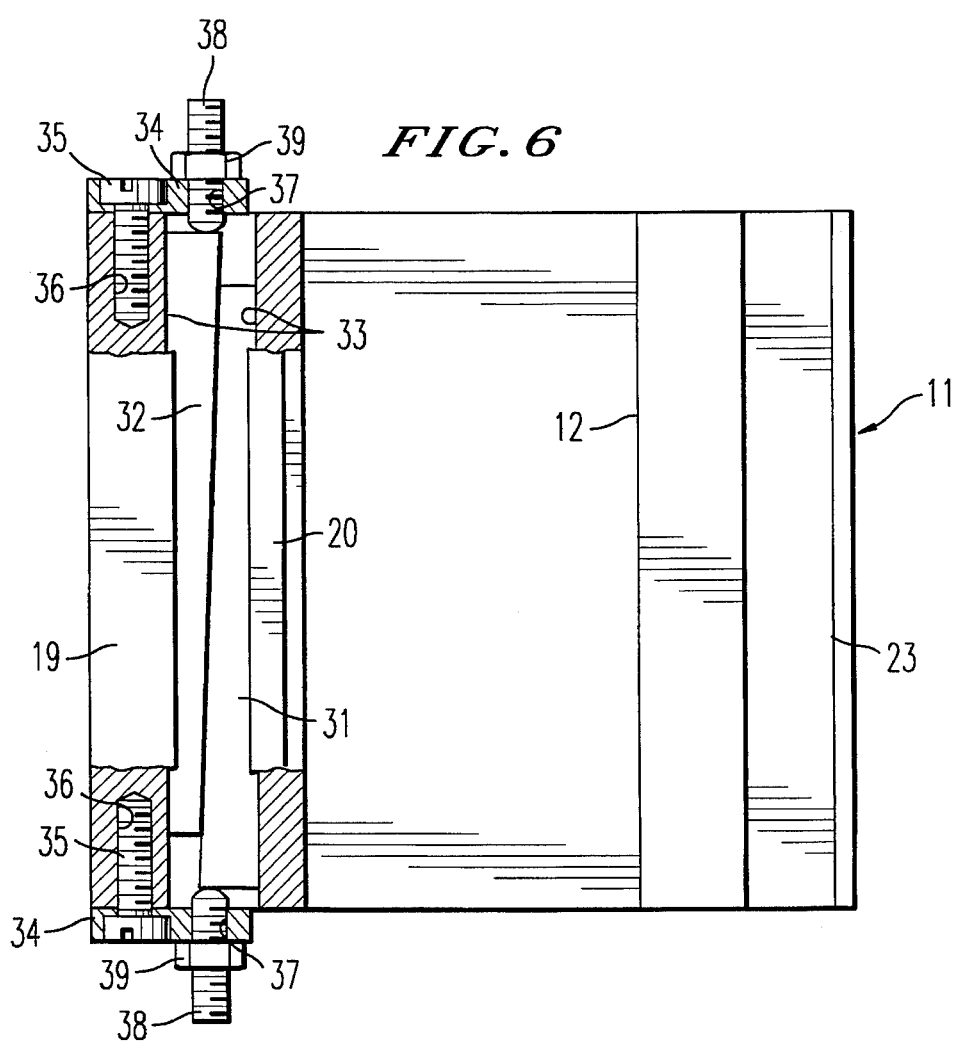

FIGS. 5 and 6 show a further embodiment of the sliding block according to the present invention in which the adjustment elements consist of a double wedge.

In this case, at the upper end of the second recess 18 there are located two wedge elements 31 and 32, arranged facing each other along their inclined surfaces in profiled seats 33 provided in the facing surfaces of the two separate portions 19 and 20 of the first flange. Elements for the shifting and mutual axial positioning of the two wedges are provided at the opposing ends of the second recess 18. These elements consist of plates 34 fixed at their first end to the portion 19 of the body of the sliding block by screws 35. The screws 35 are positioned in relative blind threaded holes 36 with their axis substantially parallel to the axis of the second recess 18. The plates 34 extend towards the interior of the sliding block by projecting over the second recess 18. This projecting second end is provided with threaded through holes 37 with their axis parallel to that of the holes 36, and carrying further screws 38. At that end facing outwards from the sliding block the screws 38 are provided with a nut 39 positionable to abut against the outside of the plate 34, whereas at their other end they act against a respective end surface of the wedges 31 and 52, causing them to interact.

Consequently the distance between the tracks 14 and 14' of the sliding block is adjusted by operating the two screws 38, which then act on the two wedges 31 and 32. By screwing said screws 38 further in, the wedges become inserted into the second recess 18 to a greater extent, so moving the separate portion 20 towards the second flange 23 of the sliding block.

Figure 7:
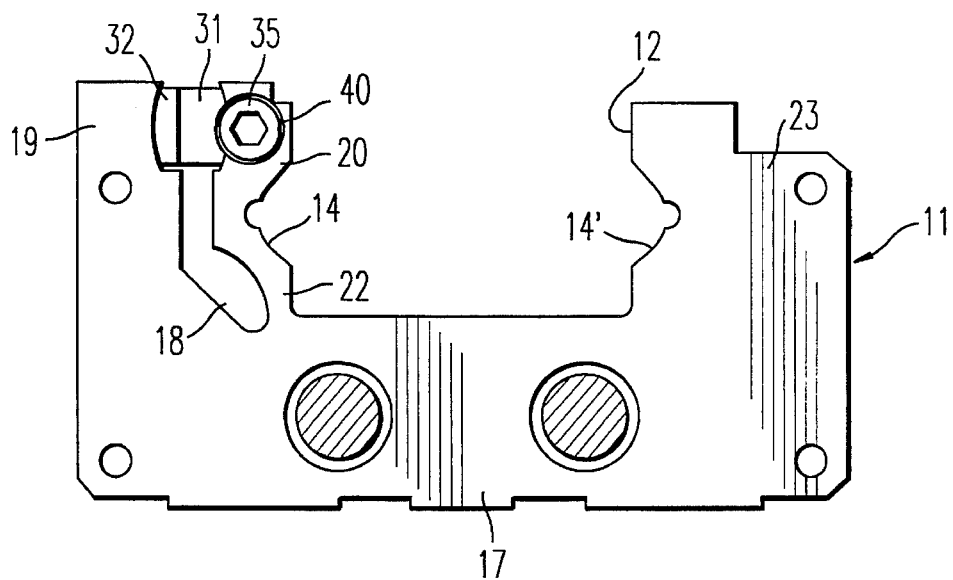
FIGS. 7 and 8 are an elevation and a top plan view of a fourth embodiment of the sliding block according to the present invention.
Figure 8:
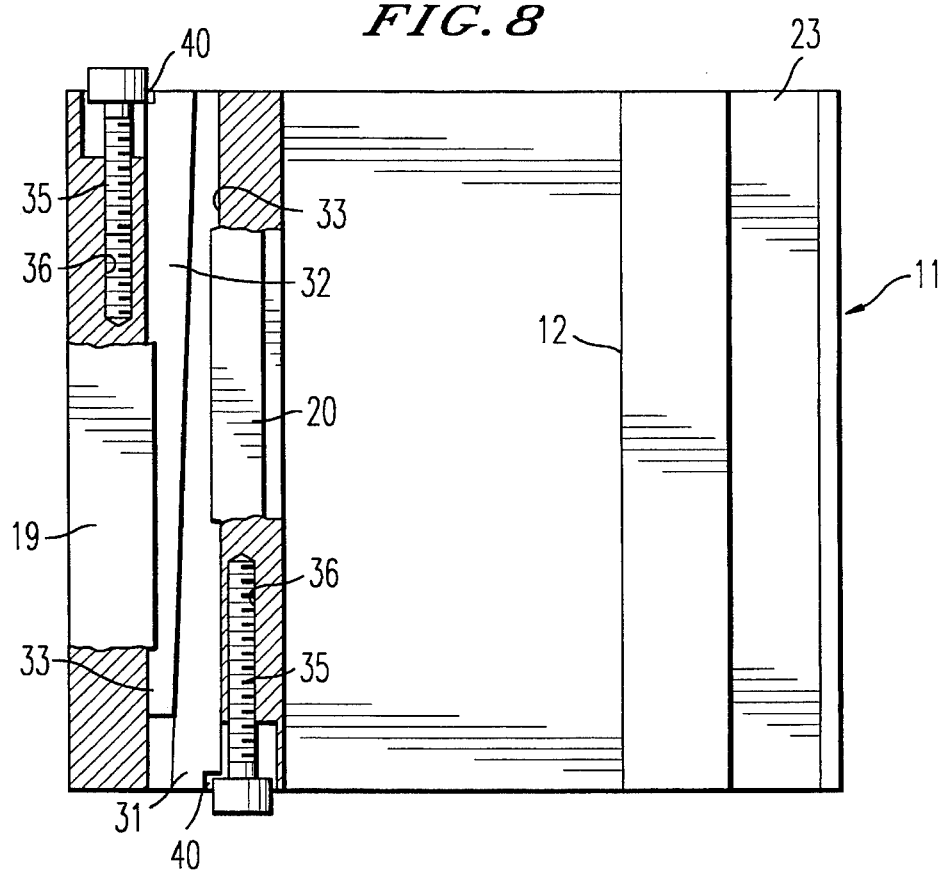

In this manner the tracks 14 and 14' move closer together to result in a change in the slack and/or a greater preload. In contrast, if the screws 38 are unscrewed, the wedging is released with consequent return of the portion 20 of the first flange to its rest position, with preload reduction and increased slack. FIGS. 7 and 8 show an embodiment in which the adjustment elements also consist in this case of a double wedge, but positioned in a simplified form.

In this respect, the screws 35 are again inserted into blind threaded holes 36 in the portion 19 of the first flange of the body of the sliding block. The heads of the screws 35 act directly on the free ends of the wedges 31 and 32, which for example for better interaction can comprise recesses 40 able to receive and better house the base of their head.

Figure 9:
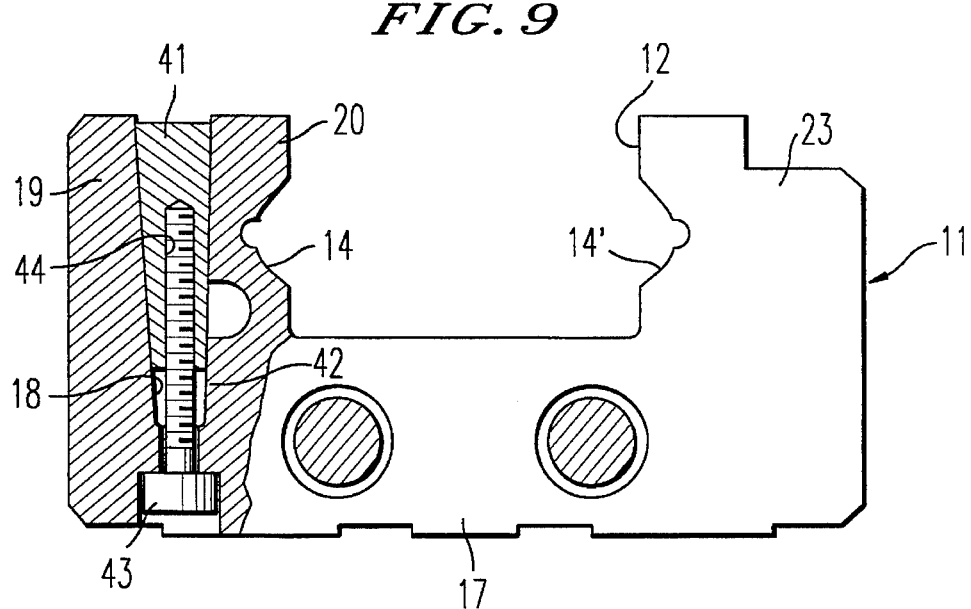
FIGS. 9 and 10 are an elevation and a bottom plan view of a fifth embodiment of the sliding block according to the present invention.
Figure 10:
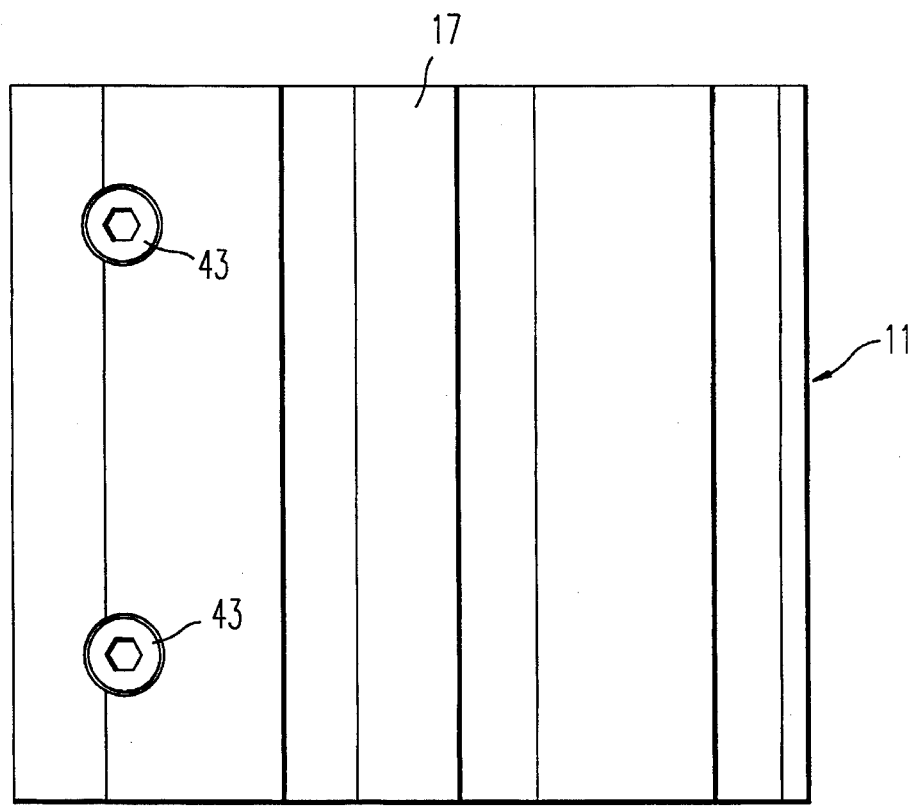

Hence in this case the wedging or the disengagement between the facing surfaces of the two wedges 31 and 32 is achieved by simply turning the screws 35 so that the wedges cause the portion 20 either to flex or to return towards its rest position. FIGS. 9 and 10 show a further embodiment of the sliding block according to the present invention in which the adjustment elements are extremely simple and consist of a single wedge.

In this respect a wedge 41 is located in the second recess 18, which in this embodiment is of a shape complementary to that of the wedge 41. A through hole 42 is provided in the central part 17 of the sliding block body below the first flange, in a position corresponding with the second recess 18, for a screw 43 which passes into a corresponding blind threaded hole 44 provided in the narrow end of the wedge 41. In this manner by operating the screw 43, or preferably two screws 43 as in the example, the wedge 41 is made to penetrate further into the relative recess 18. This wedging results in flexure of the portion 20 of the first flange with the tracks 14 and 14' coming closer together, and in adjustment of the slack and/or preload of the sliding unit. Finally in a further embodiment shown in FIGS. 11 and 12 the adjustment elements consist of a conical pin.

In this respect, the portions 19 and 20 of the first flange carry, in facing surfaces, rounded seats 45 for receiving lateral portions of a conical pin 46. The conical pin 46 is for example of frusto-conical shape and comprises along its axis blind threaded holes 47 extending from its two opposite ends. A pair of screws 48 can be screwed into said holes 47 to act against washers 49 located at opposite ends of the second recess 18 in widened end portions 50 of greater diameter than the rounded seats 45.

In this case by screwing one of the two screws 48 and unscrewing the other screw 48 the conical pin becomes wedged in to a greater or lesser extent. The portion 20 of the first flange flexes or returns to its original position to bring the tracks 14 and 14' for containing the rolling elements of the sliding unit closer together or further apart. The position of the tracks is hence again adjusted, with variation in the slack and in the preload conditions.

Figure 11:
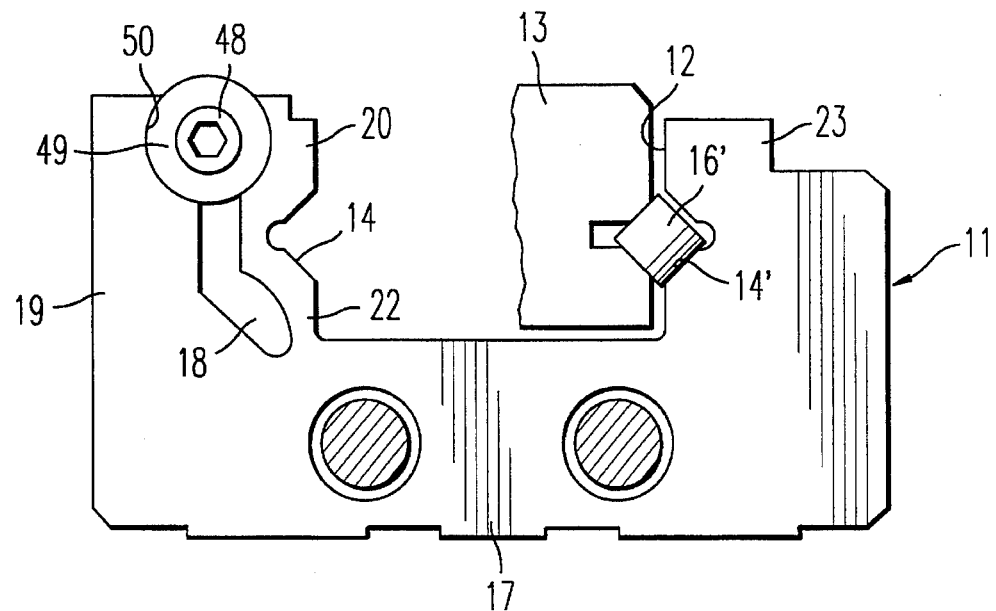
FIGS. 11 and 12 are an elevation and a top plan view of a sixth embodiment of the sliding block according to the present invention.
Figure 12:
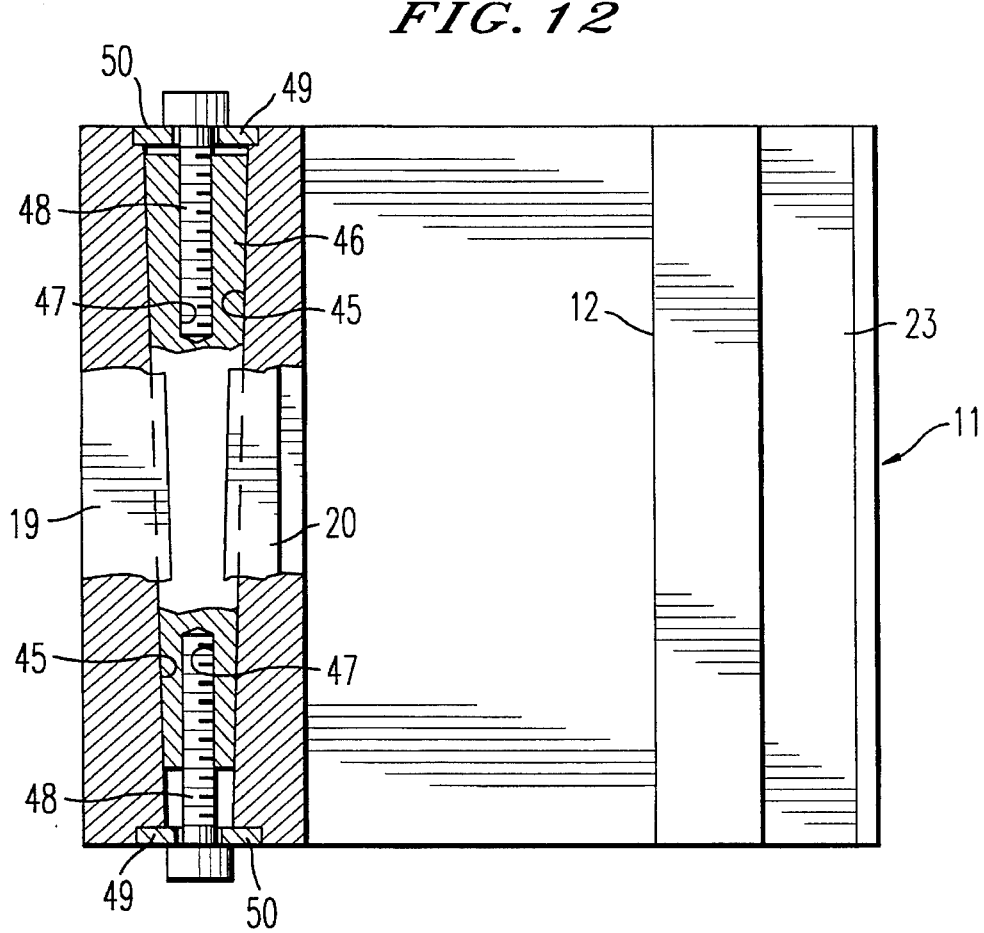

FIG. 11 shows that the tracks 14 and 14' can be shaped to receive different rolling elements such as rollers 16' shown by continuous lines. The rollers arranged in a row can be positioned either simply one behind the other or mutually crossed in order to be able to support forces of different types. A sliding block and the relative rail according to the present invention can be constructed as an extrusion, in steel or in any other suitable material, and as stated can comprise one or two longitudinal recesses with relative adjustment elements. A sliding block with adjustable track positioning is hence provided according to the invention, which enables the slack and preload conditions of the sliding unit in which it is used to be varied by virtue of the particular form of the body of the sliding block and the use of suitable adjustment elements.

I claim:

1. A sliding block with adjustable track positioning comprising a prismatic body, in one face of which there is a longitudinal recess arranged to receive a rail by way of rolling elements positionable in respective tracks, said body being essentially of C-shaped cross-section comprising a central part from which two flanges extend, characterized in that in at least one of said flanges of said C-shaped cross-section there is provided a second longitudinal recess which divides it into separate portions connected together at said central part, said second recess has a cross-section in the form of an open L with its lower end facing said first recess, said second recess containing elements for adjusting the distance between said two separate portions.

2. A sliding block as claimed in claim 1, characterized in that said rolling elements are balls.

3. A sliding block as claimed in claim 1, characterized in that said rolling elements are rollers.

4. A sliding block with adjustable track positioning comprising a prismatic body, in one face of which there is a longitudinal recess arranged to receive a rail by way of rolling elements positionable in respective tracks, said body being essentially of C-shaped cross-section comprising a central part from which two flanges extend, characterized in that in at least one of said flanges of said C-shaped cross-section there is provided a second longitudinal recess which divides it into separate portions connected together at said central part, said second recess containing adjustment elements for adjusting the distance between said two separate portions, said adjustment elements comprise screws arranged transversely to said two separate portions and acting to bring said two portions further apart or closer together, said screws pass through a seat provided in a first of said two portions and are screwed into a threaded second seat in the other of said two portions, a longitudinal eccentric shaft inserted within a relative profiled housing provided in facing surfaces of said two portions and interacting with said transversely arranged screws.

5. A sliding block as claimed in claim 4, characterized in that said shaft is provided with recesses for receiving said screws.

6. A sliding block as claimed in claim 4, characterized in that said screws are positioned within threaded seats in said other of said two portions and act against a facing surface of said first of said two portions.

7. A sliding block as claimed in claim 4, characterized in that said rolling elements are balls.

8. A sliding block as claimed in claim 4, characterized in that said rolling elements are rollers.

9. A sliding block with adjustable track positioning comprising a prismatic body, in one face of which there is a longitudinal recess arranged to receive a rail by way of rolling elements positionable in respective tracks, said body being essentially of C-shaped cross-section comprising a central part from which two flanges extend, characterized in that in at least one of said flanges of said C-shaped cross-section there is provided a second longitudinal recess which divides it into separate portions connected together at said central part, said second recess containing adjustment elements for adjusting the distance between said two separate portions, said adjustment elements comprise two wedges arranged facing each other along their inclined surfaces within profiled seats in facing surfaces of said two separate portions, elements being provided for the shifting and mutual axial positioning of said two wedges.

10. A sliding block as claimed in claim 9, characterized in that said elements for the shifting and mutual axial positioning of the two wedges comprise a pair of transverse plates, each of which is fixed at a first end to a portion of the first flange of the body of the sliding block and carries within a threaded hole a screw which acts against an end surface of one of said two wedges.

11. A sliding block as claimed in claim 9, characterized in that said elements for the shifting and mutual axial positioning of the two wedges each comprise a screw screwable into a hole provided in a portion of said first flange and acting via its head against one end of one of said wedges.

12. A sliding block as claimed in claim 9, characterized in that said rolling elements are balls.

13. A sliding block as claimed in claim 9, characterized in that said rolling elements are rollers.

14. A sliding block with adjustable track positioning comprising a prismatic body, in one face of which there is a longitudinal recess arranged to receive a rail by way of rolling elements positionable in respective tracks, said body being essentially of C-shaped cross-section comprising a central part from which two flanges extend, characterized in that in at least one of said flanges of said C-shaped cross-section there is provided a second longitudinal recess which divides it into separate portions connected together at said central part, said second recess containing adjustment elements for adjusting the distance between said two separate portions, said adjustment elements comprise a conical pin extending in a longitudinal direction and located within rounded seats provided in said facing surfaces of said two separate portions, at least one screw being provided for shifting said conical pin in a longitudinal direction.

15. A sliding block as claimed in claim 14, characterized in that the head of said at least one screw acts on a washer located at a transverse end of said second recess.

16. A sliding block as claimed in claim 14, characterized in that said rolling elements are balls.

17. A sliding block as claimed in claim 14, characterized in that said rolling elements are rollers.

* * * * *